US010880359B2

(12) United States Patent
Hadfield et al.

(10) Patent No.: US 10,880,359 B2
(45) Date of Patent: Dec. 29, 2020

(54) SYSTEM AND METHOD FOR CROSS PLATFORM DOCUMENT SHARING

(71) Applicant: Workshare, Ltd., London (GB)

(72) Inventors: Barrie Hadfield, London (GB); Richard Preen, London (GB); Tim Tanner, London (GB); Robin Glover, London (GB)

(73) Assignee: Workshare, Ltd., London (GB)

( * ) Notice: Subject to any disclaimer, the term of this patent is extended or adjusted under 35 U.S.C. 154(b) by 295 days.

(21) Appl. No.: 15/251,892

(22) Filed: Aug. 30, 2016

(65) Prior Publication Data

US 2017/0054791 A1   Feb. 23, 2017

Related U.S. Application Data

(63) Continuation-in-part of application No. 13/333,605, filed on Dec. 21, 2011.

(60) Provisional application No. 62/213,611, filed on Sep. 2, 2015, provisional application No. 62/211,848, filed on Aug. 30, 2015.

(51) Int. Cl.
*H04L 29/08* (2006.01)

(52) U.S. Cl.
CPC .............. *H04L 67/06* (2013.01); *H04L 67/02* (2013.01); *H04L 67/1097* (2013.01)

(58) Field of Classification Search
CPC ..... H04L 67/06; H04L 67/02; H04L 67/1097; H04L 9/0861; H04L 63/0807; H04L 63/083; H04L 63/107; G06F 21/6227; G06F 17/24; G06F 21/602; G06F 21/62; G06F 2221/2111; G06F 2221/2137; G06F 2221/2149; G06Q 10/101

See application file for complete search history.

(56) References Cited

U.S. PATENT DOCUMENTS

| | | |
|---|---|---|
| 4,479,195 A | 10/1984 | Herr et al. |
| 4,949,300 A | 8/1990 | Christenson et al. |
| 5,008,853 A | 4/1991 | Bly et al. |
| 5,072,412 A | 12/1991 | Henderson, Jr. et al. |
| 5,220,657 A | 6/1993 | Bly et al. |
| 5,245,553 A | 9/1993 | Tanenbaum |
| 5,247,615 A | 9/1993 | Mori et al. |
| 5,293,619 A | 3/1994 | Dean |
| 5,379,374 A | 1/1995 | Ishizaki et al. |
| 5,446,842 A | 8/1995 | Schaeffer et al. |
| 5,608,872 A | 3/1997 | Schwartz et al. |
| 5,617,539 A | 4/1997 | Ludwig et al. |
| 5,619,649 A | 4/1997 | Kovnat et al. |
| 5,634,062 A | 5/1997 | Shimizu et al. |
| 5,671,428 A | 9/1997 | Muranaga et al. |
| 5,699,427 A | 12/1997 | Chow et al. |

(Continued)

OTHER PUBLICATIONS

Restriction Requirement dated Feb. 14, 2005 in U.S. Appl. No. 10/023,010, filed Dec. 17, 2001, now U.S. Pat. No. 7/496,841.

(Continued)

*Primary Examiner* — Howard Cortes
(74) *Attorney, Agent, or Firm* — Nixon Peabody LLP

(57) ABSTRACT

This invention discloses a novel system and method for automatically managing the movement of document files from a first document storage sub-system to a second document storage sub-system, tracking such movement and applying security policies before the movement is completed.

12 Claims, 6 Drawing Sheets

(56) References Cited

U.S. PATENT DOCUMENTS

| | | | |
|---|---|---|---|
| RE35,861 E | 7/1998 | Queen |
| 5,787,175 A | 7/1998 | Carter |
| 5,787,444 A | 7/1998 | Gerken et al. |
| 5,801,702 A | 9/1998 | Dolan et al. |
| 5,806,078 A | 9/1998 | Hug et al. |
| 5,819,300 A | 10/1998 | Kohno et al. |
| 5,832,494 A | 11/1998 | Egger et al. |
| 5,890,177 A | 3/1999 | Moody et al. |
| 5,897,636 A | 4/1999 | Kaeser |
| 5,898,836 A | 4/1999 | Freivald et al. |
| 6,003,060 A | 12/1999 | Aznar et al. |
| 6,012,087 A | 1/2000 | Freivald et al. |
| 6,029,175 A | 2/2000 | Chow et al. |
| 6,038,561 A | 3/2000 | Snyder et al. |
| 6,049,804 A | 4/2000 | Burgess et al. |
| 6,067,551 A | 5/2000 | Brown et al. |
| 6,088,702 A | 7/2000 | Plantz et al. |
| 6,128,635 A | 10/2000 | Ikeno |
| 6,145,084 A | 11/2000 | Zuili et al. |
| 6,189,019 B1 | 2/2001 | Blumer et al. |
| 6,212,534 B1 | 4/2001 | Lo et al. |
| 6,219,818 B1 | 4/2001 | Freivald et al. |
| 6,243,091 B1 | 6/2001 | Berstis |
| 6,263,350 B1 | 7/2001 | Wollrath et al. |
| 6,263,364 B1 | 7/2001 | Najork et al. |
| 6,269,370 B1 | 7/2001 | Kirsch |
| 6,285,999 B1 | 9/2001 | Page |
| 6,301,368 B1 | 10/2001 | Bolle et al. |
| 6,317,777 B1 | 11/2001 | Skarbo et al. |
| 6,321,265 B1 | 11/2001 | Najork et al. |
| 6,327,611 B1 | 12/2001 | Everingham |
| 6,336,123 B2 | 1/2002 | Inoue et al. |
| 6,351,755 B1 | 2/2002 | Najork et al. |
| 6,356,937 B1 | 3/2002 | Montville et al. |
| 6,377,984 B1 | 4/2002 | Najork et al. |
| 6,404,446 B1 | 6/2002 | Bates et al. |
| 6,418,433 B1 | 7/2002 | Chakrabarti et al. |
| 6,418,453 B1 | 7/2002 | Kraft et al. |
| 6,424,966 B1 | 7/2002 | Meyerzon et al. |
| 6,449,624 B1 | 9/2002 | Hammack et al. |
| 6,505,237 B2 | 1/2003 | Beyda et al. |
| 6,513,050 B1 | 1/2003 | Williams et al. |
| 6,547,829 B1 | 4/2003 | Meyerzon et al. |
| 6,556,982 B1 | 4/2003 | McGaffey et al. |
| 6,560,620 B1 | 5/2003 | Ching |
| 6,584,466 B1 | 6/2003 | Serbinis et al. |
| 6,591,289 B1 | 7/2003 | Britton |
| 6,594,662 B1 | 7/2003 | Sieffert et al. |
| 6,596,030 B2 | 7/2003 | Ball et al. |
| 6,614,789 B1 | 9/2003 | Yazdani et al. |
| 6,658,626 B1 | 12/2003 | Aiken |
| 6,662,212 B1 | 12/2003 | Chandhok et al. |
| 6,738,762 B1 | 5/2004 | Chen et al. |
| 6,745,024 B1 | 6/2004 | DeJaco et al. |
| 6,832,202 B1 | 12/2004 | Schuyler et al. |
| 6,918,082 B1 | 7/2005 | Gross |
| 7,035,427 B2 | 4/2006 | Rhoads |
| 7,085,735 B1 | 8/2006 | Hall et al. |
| 7,107,518 B2 | 9/2006 | Ramaley et al. |
| 7,113,615 B2 | 9/2006 | Rhoads et al. |
| 7,152,019 B2 | 12/2006 | Tarantola et al. |
| 7,181,492 B2 | 2/2007 | Wen et al. |
| 7,194,761 B1 | 3/2007 | Champagne |
| 7,212,955 B2 | 5/2007 | Kirshenbaum et al. |
| 7,233,686 B2 | 6/2007 | Hamid |
| 7,240,207 B2 | 7/2007 | Weare |
| 7,299,504 B1 | 11/2007 | Tiller et al. |
| 7,321,864 B1 | 1/2008 | Gendler |
| 7,356,704 B2 | 4/2008 | Rinkevich et al. |
| 7,434,164 B2 | 10/2008 | Salesin et al. |
| 7,454,778 B2 | 11/2008 | Pearson et al. |
| 7,496,841 B2 | 2/2009 | Hadfield et al. |
| 7,564,997 B2 | 7/2009 | Hamid |
| 7,570,964 B2 | 8/2009 | Maes |
| 7,613,770 B2 | 11/2009 | Li |
| 7,624,447 B1 | 11/2009 | Horowitz et al. |
| 7,627,613 B1 | 12/2009 | Dulitz et al. |
| 7,640,308 B2 | 12/2009 | Antonoff et al. |
| 7,673,324 B2 | 3/2010 | Tirosh et al. |
| 7,680,785 B2 | 3/2010 | Najork |
| 7,685,298 B2 | 3/2010 | Day |
| 7,694,336 B2 | 4/2010 | Rinkevich et al. |
| 7,707,153 B1 | 4/2010 | Petito et al. |
| 7,720,256 B2 | 5/2010 | Desprez et al. |
| 7,730,175 B1 | 6/2010 | Roesch et al. |
| 7,788,235 B1 | 8/2010 | Yeo |
| 7,796,309 B2 | 9/2010 | Sadovsky et al. |
| 7,797,724 B2 | 9/2010 | Calvin |
| 7,818,678 B2 | 10/2010 | Massand |
| 7,844,116 B2 | 11/2010 | Monga |
| 7,857,201 B2 | 12/2010 | Silverbrook et al. |
| 7,877,790 B2 | 1/2011 | Vishik et al. |
| 7,890,752 B2 | 2/2011 | Bardsley et al. |
| 7,895,166 B2 | 2/2011 | Foygel et al. |
| 7,903,822 B1 | 3/2011 | Hair et al. |
| 7,941,844 B2 | 5/2011 | Anno |
| 7,958,101 B1 | 6/2011 | Teugels et al. |
| 8,005,277 B2 | 8/2011 | Tulyakov et al. |
| 8,042,112 B1 | 10/2011 | Zhu et al. |
| 8,117,225 B1 | 2/2012 | Zilka |
| 8,145,724 B1 * | 3/2012 | Hawks .............. H04L 67/06 |
| | | 709/213 |
| 8,181,036 B1 | 5/2012 | Nachenberg |
| 8,196,030 B1 | 6/2012 | Wang et al. |
| 8,201,254 B1 | 6/2012 | Wilhelm et al. |
| 8,209,538 B2 | 6/2012 | Craigie |
| 8,233,723 B2 | 7/2012 | Sundaresan |
| 8,286,085 B1 | 10/2012 | Denise |
| 8,286,171 B2 | 10/2012 | More et al. |
| 8,301,994 B1 | 10/2012 | Shah |
| 8,316,237 B1 | 11/2012 | Felsher et al. |
| 8,406,456 B2 | 3/2013 | More |
| 8,473,847 B2 | 6/2013 | Glover |
| 8,478,995 B2 | 7/2013 | Alculumbre |
| 8,555,080 B2 | 10/2013 | More et al. |
| 8,572,388 B2 | 10/2013 | Boemker et al. |
| 8,620,872 B1 | 12/2013 | Killalea |
| 8,635,295 B2 | 1/2014 | Mulder |
| 8,732,127 B1 | 5/2014 | Rotterdam et al. |
| 8,776,190 B1 | 7/2014 | Cavage et al. |
| 8,797,603 B1 | 8/2014 | Dougherty et al. |
| 8,839,100 B1 | 9/2014 | Donald |
| 9,098,500 B1 | 8/2015 | Asokan et al. |
| 9,311,624 B2 | 4/2016 | Diament et al. |
| 9,652,485 B1 | 5/2017 | Bhargava et al. |
| 2001/0018739 A1 | 8/2001 | Anderson et al. |
| 2001/0042073 A1 | 11/2001 | Saether et al. |
| 2002/0010682 A1 | 1/2002 | Johnson |
| 2002/0016959 A1 | 2/2002 | Barton et al. |
| 2002/0019827 A1 | 2/2002 | Shiman et al. |
| 2002/0023158 A1 | 2/2002 | Polizzi et al. |
| 2002/0052928 A1 | 5/2002 | Stern et al. |
| 2002/0063154 A1 | 5/2002 | Hoyos et al. |
| 2002/0065827 A1 | 5/2002 | Christie et al. |
| 2002/0065848 A1 | 5/2002 | Walker et al. |
| 2002/0073188 A1 | 6/2002 | Rawson, III |
| 2002/0087515 A1 | 7/2002 | Swannack et al. |
| 2002/0099602 A1 | 7/2002 | Moskowitz et al. |
| 2002/0120648 A1 | 8/2002 | Ball et al. |
| 2002/0129062 A1 | 9/2002 | Luparello |
| 2002/0136222 A1 | 9/2002 | Robohm |
| 2002/0138744 A1 | 9/2002 | Schleicher et al. |
| 2002/0159239 A1 | 10/2002 | Amie et al. |
| 2002/0164058 A1 | 11/2002 | Aggarwal et al. |
| 2003/0009518 A1 | 1/2003 | Harrow et al. |
| 2003/0009528 A1 | 1/2003 | Sharif et al. |
| 2003/0037010 A1 | 2/2003 | Schmelzer |
| 2003/0046572 A1 | 3/2003 | Newman et al. |
| 2003/0051054 A1 | 3/2003 | Redlich et al. |
| 2003/0061260 A1 | 3/2003 | Rajkumar |
| 2003/0061350 A1 * | 3/2003 | Masuoka ............ H04L 63/0428 |
| | | 709/225 |
| 2003/0078880 A1 | 4/2003 | Alley et al. |
| 2003/0084279 A1 | 5/2003 | Campagna |

(56) References Cited

U.S. PATENT DOCUMENTS

| | | |
|---|---|---|
| 2003/0093755 A1 | 5/2003 | Ramakrishnan |
| 2003/0097454 A1 | 5/2003 | Yamakawa et al. |
| 2003/0112273 A1 | 6/2003 | Hadfield |
| 2003/0115273 A1 | 6/2003 | Delia et al. |
| 2003/0131005 A1 | 7/2003 | Berry |
| 2003/0147267 A1 | 8/2003 | Huttunen |
| 2003/0158839 A1 | 8/2003 | Faybishenko et al. |
| 2003/0191799 A1 | 10/2003 | Araujo et al. |
| 2003/0196087 A1 | 10/2003 | Stringer et al. |
| 2003/0223624 A1 | 12/2003 | Hamid |
| 2003/0233419 A1 | 12/2003 | Beringer |
| 2003/0237047 A1 | 12/2003 | Borson |
| 2004/0002049 A1 | 1/2004 | Beavers et al. |
| 2004/0031052 A1 | 2/2004 | Wannamaker et al. |
| 2004/0122659 A1 | 6/2004 | Hourihane et al. |
| 2004/0128321 A1 | 7/2004 | Hamer |
| 2004/0148567 A1 | 7/2004 | Jeon et al. |
| 2004/0186851 A1 | 9/2004 | Jhingan et al. |
| 2004/0187076 A1 | 9/2004 | Ki |
| 2004/0225645 A1 | 11/2004 | Rowney et al. |
| 2004/0261016 A1 | 12/2004 | Glass et al. |
| 2005/0021980 A1 | 1/2005 | Kanai |
| 2005/0038893 A1 | 2/2005 | Graham |
| 2005/0055306 A1 | 3/2005 | Miller et al. |
| 2005/0055337 A1 | 3/2005 | Bebo et al. |
| 2005/0071755 A1 | 3/2005 | Harrington et al. |
| 2005/0108293 A1 | 5/2005 | Lipman et al. |
| 2005/0138350 A1* | 6/2005 | Hariharan ............ H04L 63/0428 713/151 |
| 2005/0138540 A1 | 6/2005 | Baltus et al. |
| 2005/0204008 A1 | 9/2005 | Shinbrood |
| 2005/0251738 A1 | 11/2005 | Hirano et al. |
| 2005/0251748 A1 | 11/2005 | Gusmorino et al. |
| 2005/0256893 A1 | 11/2005 | Perry |
| 2005/0268327 A1 | 12/2005 | Starikov |
| 2005/0278421 A1 | 12/2005 | Simpson et al. |
| 2006/0005247 A1 | 1/2006 | Zhang et al. |
| 2006/0013393 A1 | 1/2006 | Ferchichi et al. |
| 2006/0021031 A1 | 1/2006 | Leahy et al. |
| 2006/0047765 A1 | 3/2006 | Mizoi et al. |
| 2006/0050937 A1 | 3/2006 | Hamid |
| 2006/0059196 A1 | 3/2006 | Sato et al. |
| 2006/0064717 A1 | 3/2006 | Shibata et al. |
| 2006/0067578 A1 | 3/2006 | Fuse |
| 2006/0069740 A1 | 3/2006 | Ando |
| 2006/0075041 A1 | 4/2006 | Antonoff et al. |
| 2006/0098850 A1 | 5/2006 | Hamid |
| 2006/0112120 A1 | 5/2006 | Rohall |
| 2006/0129627 A1 | 6/2006 | Phillips |
| 2006/0158676 A1 | 7/2006 | Hamada |
| 2006/0171588 A1 | 8/2006 | Chellapilla et al. |
| 2006/0184505 A1 | 8/2006 | Kedem |
| 2006/0190493 A1 | 8/2006 | Kawai et al. |
| 2006/0218004 A1 | 9/2006 | Dworkin et al. |
| 2006/0218643 A1 | 9/2006 | DeYoung |
| 2006/0224589 A1 | 10/2006 | Rowney |
| 2006/0236246 A1 | 10/2006 | Bono et al. |
| 2006/0261112 A1 | 11/2006 | Todd et al. |
| 2006/0271947 A1 | 11/2006 | Lienhart et al. |
| 2006/0272024 A1 | 11/2006 | Huang et al. |
| 2006/0277229 A1 | 12/2006 | Yoshida et al. |
| 2006/0294468 A1 | 12/2006 | Sareen et al. |
| 2006/0294469 A1 | 12/2006 | Sareen et al. |
| 2007/0005589 A1 | 1/2007 | Gollapudi |
| 2007/0011211 A1 | 1/2007 | Reeves et al. |
| 2007/0025265 A1 | 2/2007 | Porras et al. |
| 2007/0027830 A1 | 2/2007 | Simons et al. |
| 2007/0038704 A1 | 2/2007 | Brown et al. |
| 2007/0094510 A1 | 4/2007 | Ross et al. |
| 2007/0100991 A1 | 5/2007 | Daniels et al. |
| 2007/0101154 A1 | 5/2007 | Bardsley et al. |
| 2007/0101413 A1 | 5/2007 | Vishik et al. |
| 2007/0112930 A1 | 5/2007 | Foo et al. |
| 2007/0150443 A1 | 6/2007 | Bergholz et al. |
| 2007/0174766 A1 | 7/2007 | Rubin et al. |
| 2007/0179967 A1 | 8/2007 | Zhang |
| 2007/0192728 A1 | 8/2007 | Finley et al. |
| 2007/0220061 A1 | 9/2007 | Tirosh et al. |
| 2007/0220068 A1 | 9/2007 | Thompson et al. |
| 2007/0253608 A1 | 11/2007 | Tulyakov et al. |
| 2007/0261099 A1 | 11/2007 | Broussard et al. |
| 2007/0261112 A1 | 11/2007 | Todd et al. |
| 2007/0294318 A1 | 12/2007 | Arora et al. |
| 2007/0294612 A1 | 12/2007 | Drucker et al. |
| 2007/0299880 A1 | 12/2007 | Kawabe et al. |
| 2008/0022003 A1 | 1/2008 | Alve |
| 2008/0028017 A1 | 1/2008 | Garbow et al. |
| 2008/0033913 A1 | 2/2008 | Winburn |
| 2008/0034282 A1 | 2/2008 | Zernik |
| 2008/0034327 A1 | 2/2008 | Cisler et al. |
| 2008/0065668 A1 | 3/2008 | Spence et al. |
| 2008/0080515 A1 | 4/2008 | Tombroff et al. |
| 2008/0082529 A1 | 4/2008 | Mantena et al. |
| 2008/0091465 A1 | 4/2008 | Fuschino et al. |
| 2008/0091735 A1 | 4/2008 | Fukushima et al. |
| 2008/0162527 A1 | 7/2008 | Pizano et al. |
| 2008/0177782 A1 | 7/2008 | Poston et al. |
| 2008/0209001 A1 | 8/2008 | Boyle et al. |
| 2008/0215667 A1* | 9/2008 | Rothbarth ............ G06F 11/1464 709/202 |
| 2008/0219495 A1 | 9/2008 | Hulten et al. |
| 2008/0235760 A1 | 9/2008 | Broussard et al. |
| 2008/0263363 A1 | 10/2008 | Jueneman et al. |
| 2008/0275694 A1 | 11/2008 | Varone |
| 2008/0288597 A1 | 11/2008 | Christensen et al. |
| 2008/0301193 A1 | 12/2008 | Massand |
| 2008/0306894 A1 | 12/2008 | Rajkumar et al. |
| 2008/0310624 A1 | 12/2008 | Celikkan |
| 2008/0320316 A1 | 12/2008 | Waldspurger et al. |
| 2009/0025087 A1 | 1/2009 | Peirson et al. |
| 2009/0030997 A1 | 1/2009 | Malik |
| 2009/0034804 A1 | 2/2009 | Cho et al. |
| 2009/0049132 A1 | 2/2009 | Gutovski |
| 2009/0052778 A1 | 2/2009 | Edgecomb et al. |
| 2009/0064326 A1 | 3/2009 | Goldstein |
| 2009/0083073 A1 | 3/2009 | Mehta et al. |
| 2009/0083384 A1 | 3/2009 | Bhogal et al. |
| 2009/0129002 A1 | 5/2009 | Wu et al. |
| 2009/0164427 A1 | 6/2009 | Shields et al. |
| 2009/0177754 A1 | 7/2009 | Brezina et al. |
| 2009/0183257 A1 | 7/2009 | Prahalad |
| 2009/0187567 A1 | 7/2009 | Rolle |
| 2009/0216843 A1 | 8/2009 | Willner et al. |
| 2009/0222450 A1 | 9/2009 | Zigelman |
| 2009/0234863 A1 | 9/2009 | Evans |
| 2009/0241187 A1 | 9/2009 | Troyansky |
| 2009/0271620 A1 | 10/2009 | Sudhakar |
| 2009/0319480 A1 | 12/2009 | Saito |
| 2010/0011077 A1 | 1/2010 | Shkolnikov et al. |
| 2010/0011428 A1 | 1/2010 | Atwood et al. |
| 2010/0017404 A1 | 1/2010 | Banerjee et al. |
| 2010/0017850 A1 | 1/2010 | More et al. |
| 2010/0049807 A1 | 2/2010 | Thompson |
| 2010/0058053 A1 | 3/2010 | Wood et al. |
| 2010/0064004 A1 | 3/2010 | Ravi et al. |
| 2010/0064372 A1 | 3/2010 | More et al. |
| 2010/0070448 A1 | 3/2010 | Omoigui |
| 2010/0076985 A1 | 3/2010 | Egnor |
| 2010/0083230 A1 | 4/2010 | Ramakrishnan |
| 2010/0114985 A1 | 5/2010 | Chaudhary et al. |
| 2010/0114991 A1 | 5/2010 | Chaudhary et al. |
| 2010/0131604 A1 | 5/2010 | Portilla |
| 2010/0146382 A1 | 6/2010 | Abe et al. |
| 2010/0174678 A1 | 7/2010 | Massand |
| 2010/0174761 A1 | 7/2010 | Longobardi et al. |
| 2010/0186062 A1 | 7/2010 | Banti et al. |
| 2010/0217987 A1 | 8/2010 | Shevade |
| 2010/0235763 A1 | 9/2010 | Massand |
| 2010/0241943 A1 | 9/2010 | Massand |
| 2010/0255352 A1 | 10/2010 | Errico |
| 2010/0274765 A1* | 10/2010 | Murphy ............ G06F 11/1451 707/652 |
| 2010/0287246 A1 | 11/2010 | Klos et al. |
| 2010/0299727 A1 | 11/2010 | More et al. |

(56) References Cited

U.S. PATENT DOCUMENTS

| | | |
|---|---|---|
| 2010/0318530 A1 | 12/2010 | Massand |
| 2010/0332428 A1 | 12/2010 | McHenry et al. |
| 2011/0029625 A1 | 2/2011 | Cheng et al. |
| 2011/0035655 A1 | 2/2011 | Heineken |
| 2011/0041165 A1 | 2/2011 | Bowen |
| 2011/0106892 A1 | 5/2011 | Nelson et al. |
| 2011/0107106 A1 | 5/2011 | Morii et al. |
| 2011/0125806 A1 | 5/2011 | Park |
| 2011/0141521 A1 | 6/2011 | Qiao |
| 2011/0145229 A1 | 6/2011 | Vailaya et al. |
| 2011/0197121 A1 | 8/2011 | Kletter |
| 2011/0225646 A1 | 9/2011 | Crawford |
| 2011/0252098 A1 | 10/2011 | Kumar |
| 2011/0252310 A1 | 10/2011 | Rahaman et al. |
| 2011/0264907 A1 | 10/2011 | Betz et al. |
| 2011/0314384 A1 | 12/2011 | Lindgren et al. |
| 2012/0011361 A1 | 1/2012 | Guerrero et al. |
| 2012/0016867 A1 | 1/2012 | Clemm et al. |
| 2012/0030563 A1 | 2/2012 | Lemonik et al. |
| 2012/0036157 A1 | 2/2012 | Rolle |
| 2012/0079267 A1 | 3/2012 | Lee |
| 2012/0079596 A1 | 3/2012 | Thomas et al. |
| 2012/0110092 A1 | 5/2012 | Keohane et al. |
| 2012/0117096 A1 | 5/2012 | Massand |
| 2012/0117644 A1 | 5/2012 | Soeder |
| 2012/0131635 A1 | 5/2012 | Huapaya |
| 2012/0133989 A1 | 5/2012 | Glover |
| 2012/0136862 A1 | 5/2012 | Glover |
| 2012/0136951 A1 | 5/2012 | Mulder |
| 2012/0151316 A1 | 6/2012 | Massand |
| 2012/0173881 A1 | 7/2012 | Trotter |
| 2012/0185511 A1 | 7/2012 | Mansfield et al. |
| 2012/0246115 A1* | 9/2012 | King .................. G06F 21/6227 707/626 |
| 2012/0265817 A1 | 10/2012 | Vidalenc et al. |
| 2012/0317239 A1 | 12/2012 | Mulder |
| 2013/0007070 A1 | 1/2013 | Pitschke |
| 2013/0060799 A1 | 3/2013 | Massand |
| 2013/0074195 A1 | 3/2013 | Johnston et al. |
| 2013/0097421 A1 | 4/2013 | Lim |
| 2013/0212707 A1 | 8/2013 | Donahue et al. |
| 2013/0227043 A1 | 8/2013 | Murakami |
| 2013/0227397 A1 | 8/2013 | Tvorun |
| 2014/0032489 A1 | 1/2014 | Hebbar et al. |
| 2014/0115436 A1 | 4/2014 | Beaver et al. |
| 2014/0136497 A1 | 5/2014 | Georgiev |
| 2014/0181223 A1 | 6/2014 | Homsany et al. |
| 2014/0280336 A1 | 9/2014 | Glover |
| 2014/0281872 A1 | 9/2014 | Glover |
| 2015/0026464 A1 | 1/2015 | Hanner et al. |
| 2015/0172058 A1 | 6/2015 | Follis |
| 2016/0350270 A1 | 12/2016 | Nakazawa |

OTHER PUBLICATIONS

Restriction Requirement dated Feb. 5, 2008 for U.S. Appl. No. 10/023,010, filed Dec. 17, 2001, now U.S. Pat. No. 7,496,841.
Restriction Requirement dated Feb. 5, 2008 in Co-Pending U.S. Appl. No. 10/023,010, filed Dec. 17, 2001, and now U.S. Pat. No. 7,496,841.
Restriction Requirement dated Jun. 30, 2006 in U.S. Appl. No. 10/136,733, filed Apr. 30, 2002.
Roussev, et al., "Integrating XML and Object-based Programming for Distributed Collaboration", IEEE, 2000, pp. 254-259.
Stephen Voida et al., Share and Share Alike: Exploring the User Interface Affordances of File Sharing, Apr. 22-27, 2006, ACM, pp. 1-10.
Sujoy Roy, et al., "Robust Hash for Detecting and Localizing Image Tampering," Image Processing, 2007, ICIP 2007, IEEE International Conference on, vol. 6, No., pp. V1-117-V1-120, Sep. 16, 2007-Oct. 19, 2007.
Sujoy Roy; Qibin Sun; , "Robust Hash for Detecting and Localizing Image Tampering," Image Processing, 2007. ICIP 2007. IEEE International Conference on , vol. 6, No., pp. VI-117-VI-120, Sep. 16, 2007-Oct. 19, 2007.
Tsai, et al., "A document Workspace for Collaboration and Annotation based on XML Technology", Department of Electrical Engineering, 2001, pp. 165-172.
Tsai, et al., "A Document Workspace for Collaboration and Annotation based on XML Technology", IEEE, 2000, pp. 165-172.
Tuklakov, et al., "Symmetric Hash Functions for Fingerprint Minutiae," International Workshop on Pattern Recognition for Crime Prevention, Security and Surveillance, Bath U.K., Oct. 2, 2005, pp. 30-38.
Tulyakov et al, Symmetric Hash Functions for Fingerprint Minutiae, ICAPR 2005, LNCS 3687, pp. 30-38, 2005.
Tulyakov et al. "Symmetric Hash Functions for Fingerprint Minutiae." International Workshop on Patter Recognition for Crime Prevention, Security and Surveillance, Bath U.K., Oct. 2, 2005, pp. 30-38.
Tulyakov, et al., "Symmetric Hash Functions for Fingerprint Minutiae," International Workshop on Pattern Recognition for Crime Prevention, Security and Surveillance, Bath U.K., Oct. 2, 2005, pp. 30-38.
U.S. Appl. No. 13/789,104, filed Mar. 7, 2013, Gofman.
V Monga, B.L. Evans Perceptual image hashing via feature points: performance evaluation and tradeoffs IEEE Transactions on Image Processing, 15 (11) (2006), pp. 3453-3466.
Weiss et al., Lightweight document matching for help-desk applications, In: Intelligent Systems and their Applications, IEEE, Vo. 15, Issue:2, pp. 57-61, ISSN 1094-7167, 2000.
Wells et al., "Groupware & Collaboration Support", www.objs.com/survey/groupwar.htm, Aug. 30, 2001, 10 pages.
Written Opinion of PCT Application No. PCT/US2009/051313, dated Mar. 3, 2010, 3 pages.
Written Opinion of PCT Application No. PCT/US2009/051313, dated Mar. 3, 2010, 4 pages.
Written Opinion PCT Application No. PCT/2009/064919, dated Jul. 1, 2010, 4 pages.
Written Opinion PCT Application No. PCT/US2009/056651, dated Apr. 21, 2010, pp. 1-5.
Written Opinion PCT Application No. PCT/US2009/056668 dated Apr. 16, 2010 pp. 1-4.
Written Opinion PCT Application No. PCT/US2009/056668, dated Apr. 16, 2010, 4 pages.
Written Opinion PCT Application No. PCT/US2009/064919 dated Jul. 1, 2010, pp. 1-4 pages.
Written Opinion PCT Application No. PCT/US2009/064919 dated Jul. 1, 2010, pp. 1-4.
Written Opinion PCT Application No. PCT/US2009/065019 dated Jun. 4, 2010, p. 1-5.
Written Opinion PCT Application No. PCT/US2009/065019 dated Jun. 4, 2010, pp. 1-5.
Written Opinion PCT Application No. PCT/US2009/065019, dated Jun. 4, 2010, 5 pages.
Written Opinion PCT Application No. PCT/US2010/043345 dated Apr. 28, 2011, 4 pages.
Written Opinion PCT/US2009/056651 dated Apr. 21, 2010, pp. 1-5.
XP-002257904, "Workshare Debuts Synergy", 2003, 3 pages.
Advisory Action dated Apr. 12, 2013, in Co-Pending U.S. Appl. No. 12/621,429 by More, S., filed Nov. 18, 2009.
Advisory Action dated Nov. 1, 2013, in Co-Pending U.S. Appl. No. 13/659,793 by More, S., filed Oct. 24, 2012.
Co-pending U.S. Appl. No. 10/023,010, filed Dec. 17, 2001.
Co-pending U.S. Appl. No. 10/136,733, filed Apr. 30, 2002.
Co-pending U.S. Appl. No. 12/177,043, filed Jul. 21, 2008.
Co-pending U.S. Appl. No. 12/209,082, filed Sep. 11, 2008.
Co-pending U.S. Appl. No. 12/209,096, filed Sep. 11, 2008.
Co-pending U.S. Appl. No. 12/275,185, filed Nov. 20, 2008.
Co-pending U.S. Appl. No. 12/621,429, filed Nov. 18, 2009.
Co-pending U.S. Appl. No. 12/844,818, filed Jul. 27, 2010.
Co-pending U.S. Appl. No. 13/306,765, filed Nov. 29, 2011.
Co-pending U.S. Appl. No. 13/306,798, filed Nov. 29, 2011.
Co-pending U.S. Appl. No. 13/306,819, filed Nov. 29, 2011.
Co-pending U.S. Appl. No. 13/620,364, filed Sep. 14, 2012.

(56) References Cited

OTHER PUBLICATIONS

Co-Pending U.S. Appl. No. 13/659,793, filed Oct. 24, 2012.
Co-Pending U.S. Appl. No. 13/659,817, filed Oct. 24, 2012.
Final Office Action dated Apr. 16, 2012 in Co-Pending U.S. Appl. No. 12/177,043, filed Jul. 21, 2008.
Final Office Action dated Apr. 17, 2007 for U.S. Appl. No. 10/023,010, filed Dec. 17, 2001, now U.S. Pat. No. 7,496,841.
Final Office Action dated Apr. 17, 2007 for U.S. Appl. No. 10/023,010, filed Dec. 7, 2001, now U.S. Pat. No. 7,496,841.
Final Office Action dated Apr. 17, 2007 in Co-Pending U.S. Appl. No. 10/023,010, filed Dec. 17, 2001, now U.S. Pat. No. 7,496,841.
Final Office Action dated Aug. 12, 2011 for U.S. Appl. No. 12/209,096, filed Sep. 11, 2008.
Final Office Action dated Aug. 12, 2011 in Co-Pending U.S. Appl. No. 12/209,096, filed Sep. 11, 2008.
Final Office Action dated Aug. 16, 2013 in co-pending U.S. Appl. No. 13/306,798 of Glover, R.W., filed Nov. 29, 2011.
Final Office Action dated Feb. 1, 2013 in Co-Pending U.S. Appl. No. 12/621,429 by More, S., filed Nov. 18, 2009.
Final Office Action dated Feb. 1, 2013 in Co-Pending U.S. Appl. No. 12/621,429 of More, S., filed Nov. 18, 2009.
Final Office Action dated Jan. 18, 2013 in Co-Pending U.S. Appl. No. 12/844,818 by Glover, R., filed Jul. 27, 2010.
Final Office Action dated Jan. 18, 2013 in Co-Pending U.S. Appl. No. 12/844,818 of Glover, R., filed Jul. 27, 2010.
Final Office Action dated May 10, 2012 in Co-Pending U.S. Appl. No. 12/209,082, filed Sep. 11, 2008.
Final Office Action dated May 10, 2012 in Co-Pending U.S. Appl. No. 12/209,082.
Final Office Action dated Oct. 21, 2013, in Co-Pending U.S. Appl. No. 13/659,793 by More, S., filed Oct. 24, 2012.
"3BClean".
"EzClean—Metadata removal utility for Microsoft Office".
"MIMEsweeper Solutions".
"CS MAILsweeper™ 4.3 for SMTP" by Clearswift Ltd ( © 2002).
"EzClean—New Features—version 3.3".
"EzClean 3.2—New Features".
"EzClean FAQ".
"How do I make sure that there is no embarrassing Metadata in any documents that I attach to e-mails? ezClean makes it easy!".
"Lotus Announces cc:Mail for the World Wide Web; Provides EasyAccess to E-Mail via the Web".
"Middleboxes: Taxonomy and Issues," Internet Engineering TaskForce (IETF), RFC 3234 (Feb. 2002).
"MIME (Multipurpose Internet Mail Extensions): Mechanisms forSpecifying and Describing the Format of Internet Message Bodies," Internet Engineering Task Force (IETF), RFC 1341 (Jun. 1992).
"Think Your Deletions are Gone Forever? Think Again! ezClean Makes Metadata Removal Easy!".
3B Clean: What is the Problem? 3B is the solution.
3B Transform from 2005.
3BOpen Doc Making StarOffice and OpenOffice.org a viable option.
3BOpenDoc—Convert documents to and from OSF.
Bitform Extract SDK 2005.1.
EZclean version 3.3 Installation Guide and Admin Manual.
EzClean version 3.3 Integration Guide for use with CS MailSweeper for SMTP.
Jamison, Scott. Essential SharePoint 2010: Overview, Governance, and Planning. Addison-Wesley Professional; 1 edition (Aug. 22, 2010).
Lightfoot, Johnathan and Beckett, Chris. Plain & Simple Microsoft® SharePoint® 2010. O'Reilly Media, Inc. Copyright © 2010.
Londer, Olga and Coventry, Penelope. Step by Step Microsoft® SharePoint® Foundation 2010. Microsoft Press. ISBN: 978-0-7356-2726-0. Copyright © 2011.
Pattison,Ted et al. Inside Microsoft® SharePoint® 2010. Critical Path Training, LLC © 2011.
Sahil Malik. Microsoft SharePoint 2010: Building Solutions for SharePoint 2010 . Apress; 1st ed. edition (Jun. 7, 2010).
Silver, Michael A.; MacDonald, Neil. Plan to Deal with Metadata Issues with Windows Vista. Gartner, Inc.. Dec. 21, 2005.ID No. G00136321.
Simple Mail Transfer Protocol, Internet Engineering Task Force(IETF), RFC 821 (Aug. 1982).
Non-final office action issued for U.S. Appl. No. 13/799,067 dated Oct. 30, 2014.
Non-Final Office Action dated Apr. 26, 2013 in Co-Pending U.S. Appl. No. 13/659,817 of More, S., filed Oct. 24, 2012.
Non-Final Office Action dated Apr. 27, 2012 in Co-Pending U.S. Appl. No. 12/275,185 of More, S., filed Nov. 20, 2008.
Non-Final Office Action dated Apr. 27, 2012 in Co-Pending U.S. Appl. No. 12/275,185, filed Nov. 20, 2008.
Non-Final Office Action dated Aug. 1, 2012 in Co-Pending U.S. Appl. No. 12/621,429, filed Nov. 18, 2009.
Non-Final Office Action dated Aug. 1, 2012 in Co-Pending U.S. Appl. No. 12/621,429 of More, S., filed Nov. 18, 2009.
Non-Final Office Action dated Aug. 13, 2013 in co-pending U.S. Appl. No. 13/306,819 by Glover, R.W., filed Nov. 29, 2011.
Non-Final Office Action dated Dec. 22, 2011 in Co-Pending U.S. Appl. No. 12/209,082.
Non-Final Office Action dated Dec. 6, 2012 in co-pending U.S. Appl. No. 13/306,798, filed Nov. 29, 2011.
Non-Final Office Action dated Jan. 9, 2012 in Co-Pending U.S. Appl. No. 12/177,043, filed Jul. 21, 2008.
Bettenburg et al., An Empirical Study on the Risks of Using Off-the-Shelf Techniques for Processing Mailing List Data, 2009, IEEE 4 pages.
Bindu et al., Spam War: Battling Ham against Spam, 2011 IEEE 6 pages.
Bobba et al. Attribute-Based Messaging: Access Control and Confidentiality, 2010, ACM 35 pages.
Chen et al., Online Detection and Prevention of Phishing Attacks, 2006, IEEE 7 pages.
Karnouskos et al., Active Electronic Mail, 2002, ACM 6 pages.
Kaushik et al., Email Feedback: A Policy based Approach to Overcoming False Positives, 2005, 10 pages.
Stolfo et al., AMT?MET: Systems for Modeling and Detecting Errant Email. 2003, IEEE 6 pages.
Jain, Pravin. The class of JAVA. Aug. 12, 2010.
Final office action dated Aug. 15, 2012 for U.S. Appl. No. 11/336,329 which published as U.S. Pub. No. 2007/0174766 for "Hidden document data removal" to Rubin et. al..
Greg Shultz. article "Keep Microsoft Office Documents Clean with iScrub," published by TechRepublic.com on Jul. 9, 2003.
Mike Heck. Keep Sensitive Data Out of E-Mails. InfoWorld.com. Apr. 24, 2006.
Workshare Ltd. Workshare Protect 4.5 Admin Guide, (c) 2006.
Workshare Ltd. Workshare Protect 4.5 User Guide, (c) 2006.
Classification Definitions Class 715, Data Processing: Presentation Processing of Document, Operator Interface Processing, and Screen Saver Display Processing; Feb. 2011, pp. 1-33.
Non-Final Office Action dated Mar. 11, 2011, in Co-pending U.S. Appl. No. 12/209,096, filed Sep. 11, 2008.
Non-Final Office Action dated Mar. 16, 2006 for U.S. Appl. No. 10/023,010, filed Dec. 17, 2001, now U.S. Pat. No. 7,496,841.
Non-Final Office Action dated Mar. 18, 2013 in Co-Pending U.S. Appl. No. 13/659,793 of More, S., filed Oct. 24, 2012.
Non-Final Office Action dated Mar. 20, 2006 in co-pending U.S. Appl. No. 10/136,733, filed Apr. 30, 2002.
Non-Final Office Action dated May 17, 2013 in co-pending U.S. Appl. No. 13/306,765 by Mulder, S.P.M., filed Nov. 29, 2011.
Non-Final Office Action dated May 7, 2008 in Co-pending U.S. Appl. No. 10/023,010, filed Dec. 17, 2001.
Non-Final Office Action dated Sep. 19, 2011 in Co-Pending U.S. Appl. No. 12/177,043, filed Jul. 21, 2008.
Non-Final Office Action dated Sep. 19, 2012 in Co-Pending U.S. Appl. No. 12/844,818 by Glover, R., filed Jul. 27, 2010.
Notice of Allowance dated Aug. 19, 2012 in Co-Pending U.S. Appl. No. 12/177,043, filed Jul. 21, 2008.
Notice of Allowance dated Jul. 8, 2013 in Co-Pending U.S. Appl. No. 12/209,082 by S. More et al., filed Sep. 11, 2008.

(56) References Cited

OTHER PUBLICATIONS

Notice of Allowance dated Jun. 26, 2012 in Co-Pending U.S. Appl. No. 12/275,185 of More, S., filed Nov. 20, 2008.
Notice of Allowance dated Mar. 13, 2013 in Co-Pending U.S. Appl. No. 12/844,818 of Glover, R., filed Jul. 27, 2010.
Notice of Allowance dated Oct. 2, 2012, in Co-Pending U.S. Appl. No. 12/275,185 of More, S., filed Nov. 20, 2008.
Notice of Allowance dated Oct. 24, 2008 in Co-Pending U.S. Appl. No. 10/023,010, filed Dec. 17, 2001, now U.S. Pat. No. 7,496,841.
Notice of Allowance dated Sep. 25, 2013, in Co-Pending U.S. Appl. No. 13/659,817 by More, S., filed Oct. 24, 2012.
PC Magazine "Pure Intranets: Real-Time Internet Collaboration", http://www.zdnet.com/pcmag/featuresgroupware/gpwst.htm, Aug. 30, 2001, 2 pages.
Restriction Requirement dated Jun. 30, 2006 for U.S. Appl. No. 10/136,733, filed Apr. 30, 2002.
Restriction Requirement dated Feb. 14, 2005 for U.S. Appl. No. 10/023,010, filed Dec. 17, 2001, now U.S. Pat. No. 7,496,841.

\* cited by examiner

SYSTEM AND METHOD FOR CROSS PLATFORM DOCUMENT SHARING

PRIORITY CLAIM

This application claims priority as a non-provisional application to U.S. Provisional Application No. 62/213,611, filed on Sep. 2, 2015, a non-provisional application to U.S. Provisional Application No. 62/211,848 filed on Aug. 30, 2015 and as a continuation in part to U.S. patent application Ser. No. 13/333,605 filed on Dec. 21, 2011, and all of which are hereby incorporated by reference in their entireties.

FIELD OF INVENTION

The present invention generally relates to the field of document data file management, data security applied to such data files and data file communication by and among computer systems. In one embodiment, the invention operates on a system comprised of at least one local computer operated by a user, a server system operating the Workshare server and at least one server operating a corresponding third party Saas document sharing platform, whereby the local computer and the servers are in communication using a data network.

BACKGROUND

In the past most document sharing was done via email but in recent years' users have seen the benefits derived from sharing documents in online shared containers and sought to have content being synchronised between these containers and their own computers and mobile devices. This market shift has led to a large number of File Sharing, File Synchronization and Collaboration systems designed to make collaboration easier and for files to be synchronised to wherever a user might want to consume them. The fact that there is not one dominant vendor or technology in this space, but a large number of different vendors and different technological platforms has lead to a number of problems when two organizations that use two different solutions wish to communicate or share documents. They end up relying on inferior technology that both organizations happen to have available—not the platforms that they use internally. This introduces inconveniences like lost document versions, version conflicts, vulnerabilities to security and the like. Therefore, there is a need for a computer system and method of operating computer systems that is an agnostic and consolidated technical solution for document storage, sharing and communication that provides productivity gains for users, and control and risk reduction for organisations by permitting such uses across multiple platforms.

The problem of multiple document sharing platforms can be considered from four perspectives:

Content Producer: The modern information professional (someone who produces documents for a living) is being faced with an ever increasing number of SaaS (Software as a Service) based (cloud) systems for storing and sharing documents. These systems include onsite or cloud based enterprise collaboration applications, traditional secure document repositories, home grown Intranet sites and an ever increasing number of modern cloud based SaaS file sharing systems. In a professional service context, often the choice of which system to use is not governed by the content producer, but by his client (the content consumer). As a result, users are required to work across many of these systems on a daily basis.

Content Consumer: From the client's (i.e. the content consumer) perspective, the problem is the same. Unless they are able to mandate that all their content producing counterparts use the same system as they do for file sharing and collaboration (which is unlikely) they are faced with the same dilemma. This example is well illustrated by the challenges corporate counsels face when dealing with multiple law firms and multiple stakeholders internal to the organization. Getting everyone to use the same document storage, sharing management and transmission system is often an impossibility. As a result of the administrative burden this imposes, typically users revert to the lowest common denominator—email with attachments.

Information Governance perspective: The situation above is a nightmare for those charged with data loss prevention and ensuring that information access policy is adhered to. For example, an organization might have a policy that no hidden information found inside documents (for example, metadata) should accidently leave the organization. This organization might have taken measures to ensure this level of protection over files being exchanged in email, but has an ever increasing gaping hole when it comes to SaaS based file sharing systems (which due to their simplicity and mass adoption are often the client's choice). Additionally, the organization (either of the content producers or content consumers) might have invested in an Enterprise Content Management system. In this case, the organisational goal will be to ensure that all content is stored in their chosen ECM/DMS system instead of being distributed in an ever increasing number of external systems.

Market perspective: The number of Enterprise File Sharing Systems is increasing rapidly. The market research firm Gartner Group tracked about 170 companies. Dominant incumbent vendors all have offerings competing against new highly funded startuipvendors and there is a plethora of specialist vendors who provide a unique value proposition over and above basic file sharing—product like Workshare's Transact™ are examples of applications that deliver file sharing in a unique way, aligned with the use cases in the markets in which they operate. Different vendors are taking different approaches to compete. Some SaaS vendors have made available their up their proprietary application programming interface protocols (APIs) to position themselves as platforms whereas others have doubled down on their unique proprietary technology to deliver narrow products and services. Prices are being squeezed and as a result, there is a race to the bottom in terms of prices for data storage. There needs to be a way of working across the boundaries around these systems, effortlessly and safely.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 101 is first introduced and discussed with respect to FIG. 1).

DETAILED DESCRIPTION

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

Figure 1:
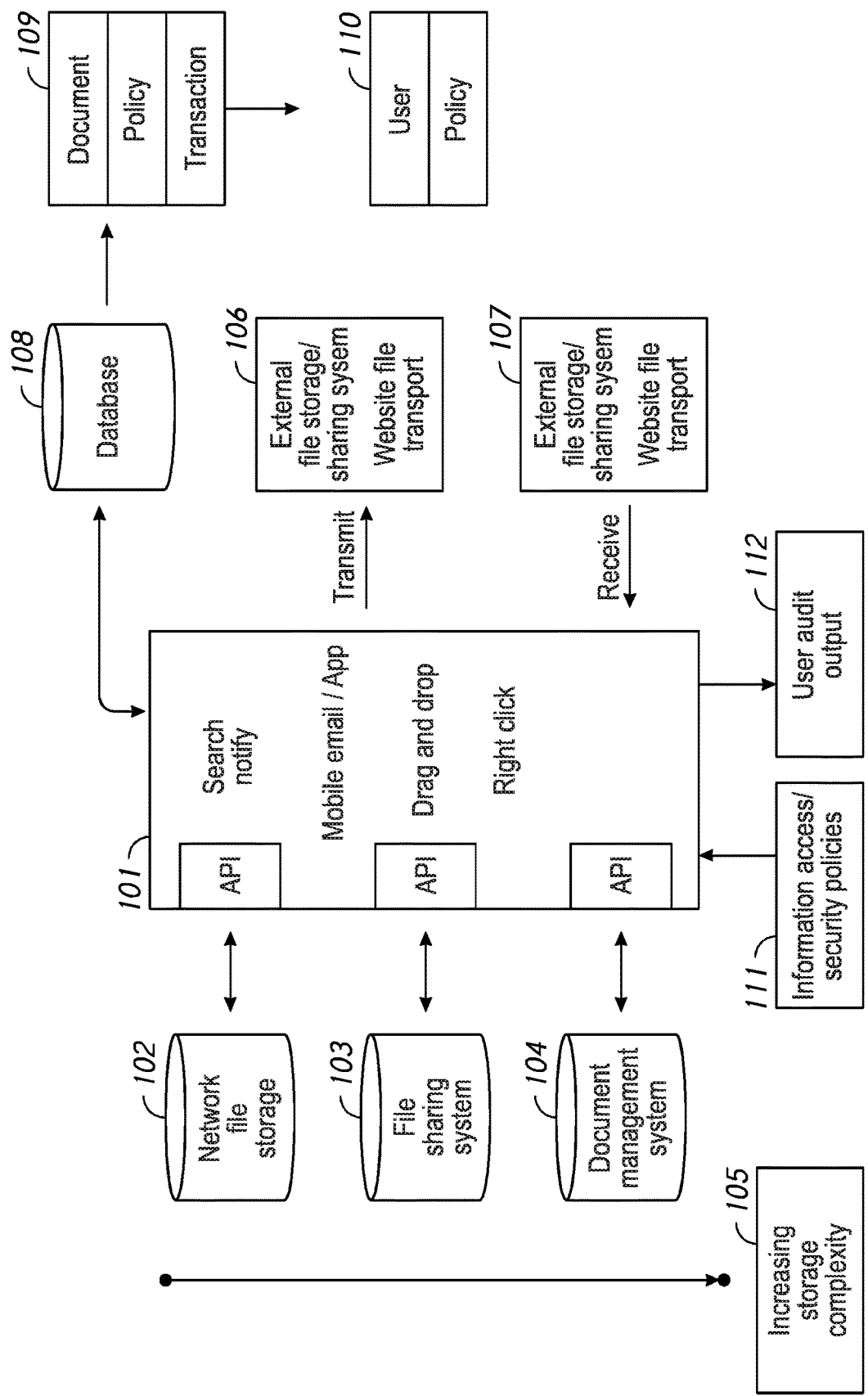
FIG. 1 shows the basic architecture of the invention.

The invention is a computer system and computer operated process that provides an agnostic and consolidated position between all of these other systems to provide productivity gains for users and control and risk reduction for organisations. In one embodiment of the invention, FIG. 1, a system interfaces with each of these other type of document systems and services in order to manage the interaction between them. Referring to FIG. 1, a user of the system embodying the invention, 101, can search or select a file from a variety of locations with increasing complexity. For example, network storage (102), a file sharing SaaS system (103) or a document management system (DMS) (104). The user can then request that the invention route the file to an external location, (106), which may be a external file sharing Saas, transmission by email or even using web services for file transmission. Likewise, the system may receive a file from one of these external data sources (107). That received file may be forwarded on by the invention to any of the data storage locations (102), (103), (104). In the meantime, the movement of the file is transaction data stored in a database accessed by the invention (108). That database (109) in one embodiment stores a data record that corresponds to the document that may include security policy data. In addition, that file may be related to a data record for the user (110). The invention provides the ability to receive security protocols that can be associated with a user (111). Likewise, the database (108) can be used to generate an audit report on use of a file or use of the system by the user (112).

The Benefit to the User:
Regardless of the file sharing systems they use; all files are available to them in a central location. This gives users the advantage of being able to benefit from the value delivered by any of the file sharing systems yet the confidence to know that all their files are easily accessible to them outside of any of those systems Users are able to organize their files as they like yet publish them into the organisational paradigms found in file sharing systems. For example, the user might order their files and folders by Client, Project and Status whereas the client might organize the file sharing system (which both parties are using) very differently (by department, provider or project milestone). The invention maintains data structures that for a given document, map between these two different ways of organising files thus making this distinction transparent to the user. The invention uses the mapping so that the user's applicable parameters present a FileOpen dialog where selection of the file is in accordance with the user's preferred organization. When the invention delivers the file to an external destination, the mapping is used by the invention to input the appropriate parameters defining the metadata of the document into the destination context.

Users can easily publish files to a third party system and then re-publish them as they evolve the same way because the invention maintains data structures that for each document track where the document was published. This is very advantageous when one document file might be published to more than one document sharing system because the invention automatically updates all systems where a version of a file is being shared.

Users can accurately and quickly understand what is different between documents as they evolve through their versions. In one embodiment, Workshare's™ document comparison software is utilized by the invention to automatically show users exactly what changed between versions of a document file.

Benefits to the Organisation:

Risk is reduced as all document files that are uploaded to file sharing systems are processed through the system that operates a document policy system which can remove hidden information or block the upload/sharing of files if inappropriate Record all events where files are uploaded (which file, when, by whom and to where). Suspicious activity can then be tracked and reported on. This provides a central location to obtain document use auditing.

Retain information as copies of files uploaded are retained and accessible centrally without having to go into each of the system those files where uploaded to.

Figure 2:
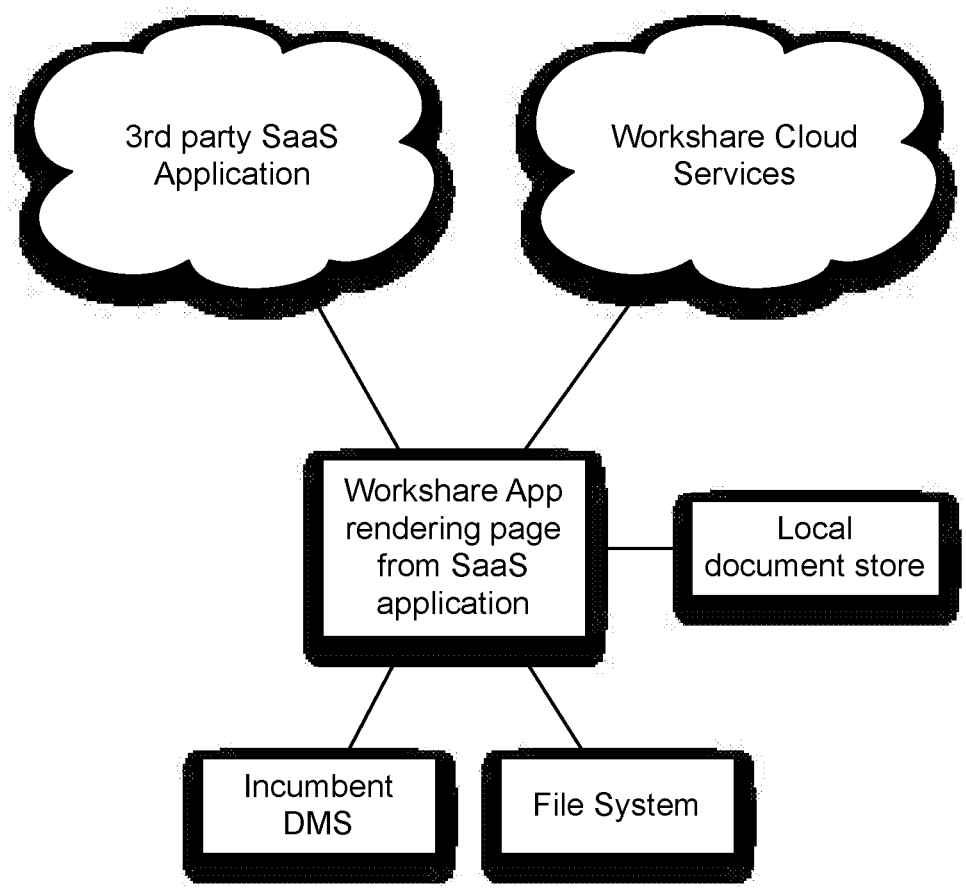
FIG. 2 shows the workflow where a user uploads a file from the document management system to a third party SaaS system.

To accomplish this product proposition, the system and its operation has to provide several functionalities:

1. A way to participate in the upload and download of files to and from any number of SaaS based file sharing applications
2. A policy based system which inserts itself between such an upload or download
3. Deep integrations into incumbent ECM/DMS systems
4. Most importantly, a user interface which users prefer to use over and above what they get from using a browser to access SaaS based file sharing tools. Key to accomplishing the last task is to not in any way reduce the offering of the SaaS vendor but provide additional functionality and control to the user on top of the experience delivered The invention essentially participates in the upload and download of files from the user's computer (or an incumbent ECM/DMS system the user is using) to one or more SaaS based 3rd party systems or internal systems that the organization uses. By user computer, a desktop, laptop, tablet or smartphone may be used. To accomplish this, the user operates an application that embodies the invention (referred to as the Workshare App) which provides access to 3rd party SaaS application and provides enhanced functionality to upload and download files from the user's computer (or a DMS system the user is using) to and from the 3rd party system or the organization's internal systems. See FIG. 2.

Figure 4:
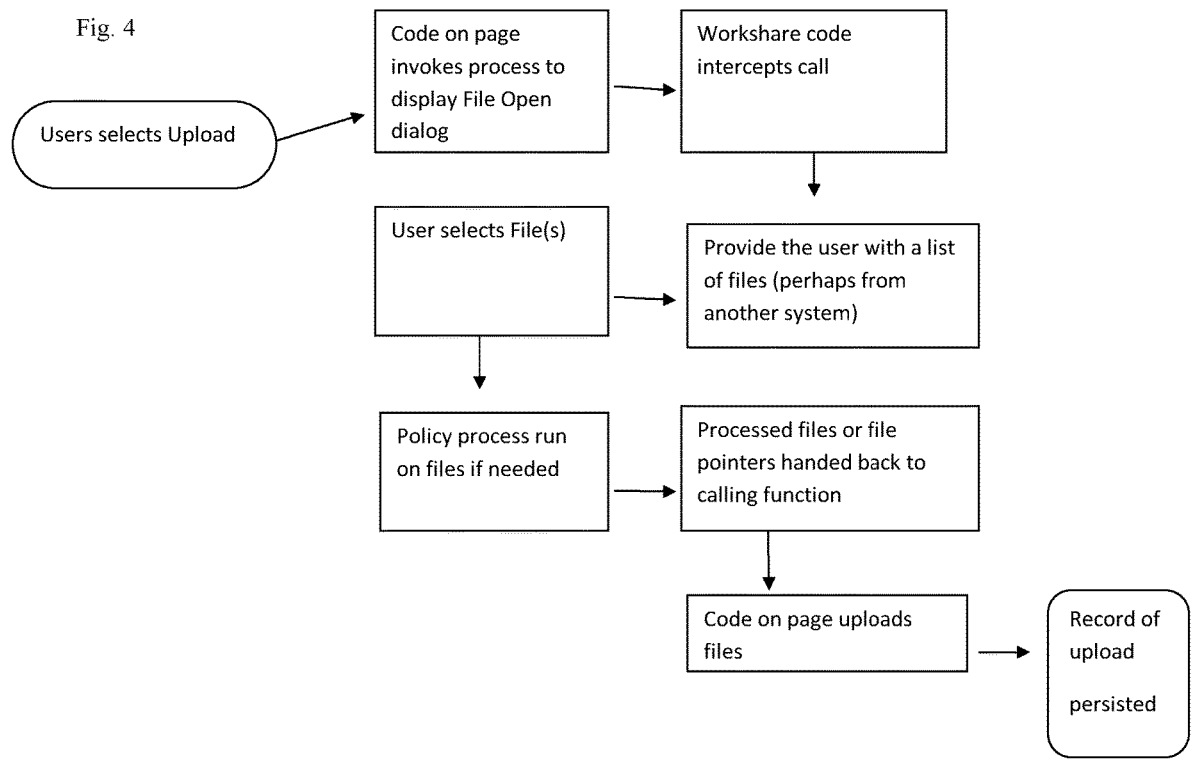
FIG. 4 shows the workflow where the system receives a link to the file from on the third party document management system and the file is transferred to the user's device for editing.

To illustrate how this works, consider the following workflow where a user would like to upload a file from their DMS to a 3rd party, external SaaS system (See FIG. 4):

1. User opens the Workshare App and navigates to the SaaS file sharing folder where the file is to be uploaded.

2. User clicks 'Upload' which is a standard Upload button rendered in the page received from the SaaS provider.

3. Instead of being presented with a standard File Open dialog box, the invention intercepts that process step and instead the user is presented with a Workshare File Open dialog which could render any of the following:
   a. A file selector of all known files for the user.
   b. An DMS File Open dialog for the user to search for the file they want to upload within the DMS used by the user.
   c. A standard File Open dialog to select a file from their file system on their computer device.

4. The user selects the file to upload.

5. Before the file (or a pointer to it) is actually passed to the external Saas application, the Workshare App runs a policy check against the file and preforms any policy actions required, which might include:
   a. Converting the file to another format (for example, Word to PDF).
   b. Removing hidden metadata, comments or other confidential information from the file.
   c. Redacting or modifying the file in some way to remove or obscure confidential information.
   d. Blocking the upload based on metadata attributes or context derived from the DMS system which prohibits this file from being transmitted outside the organization's perimeter.

6. After the policy checks are preformed, the file (or a pointer to it) is handed to the external SaaS application which then dutifully uploads the document data file to whichever destination folder location was selected.

7. The whole transaction may be tracked by the Workshare App, so a record of this user uploading this file, at this time, from this source, to this destination can be recorded in one or both of a local database and pushed to the Workshare Cloud Services APIs:
   a. This information can be used for subsequent reporting or auditing.
   b. Additionally, this information will be stored in order to be used to provide remembered context for the user, so—for example—the invention remembers where files have been published to so any subsequent edits made to the local copy of the same document file can be easily re-published. The user can also override this saved context.

In yet another embodiment of this invention, a custom web browser may be used with a computer system that implements advance file selection dialogs with DMS and policy integration. This may be built using open source code from a typical web browser. An implementation of this strategy using Chromium Extension Framework™ is described in more detail below.

In yet another embodiment of this invention uses customized file selection dialog boxes in the user interface that are integrated into an existing web browser either via a browser addin or an extension or by customization at a lower level (for instance selectively replacing or modifying the operating system file selection dialogs).

Figure 3:
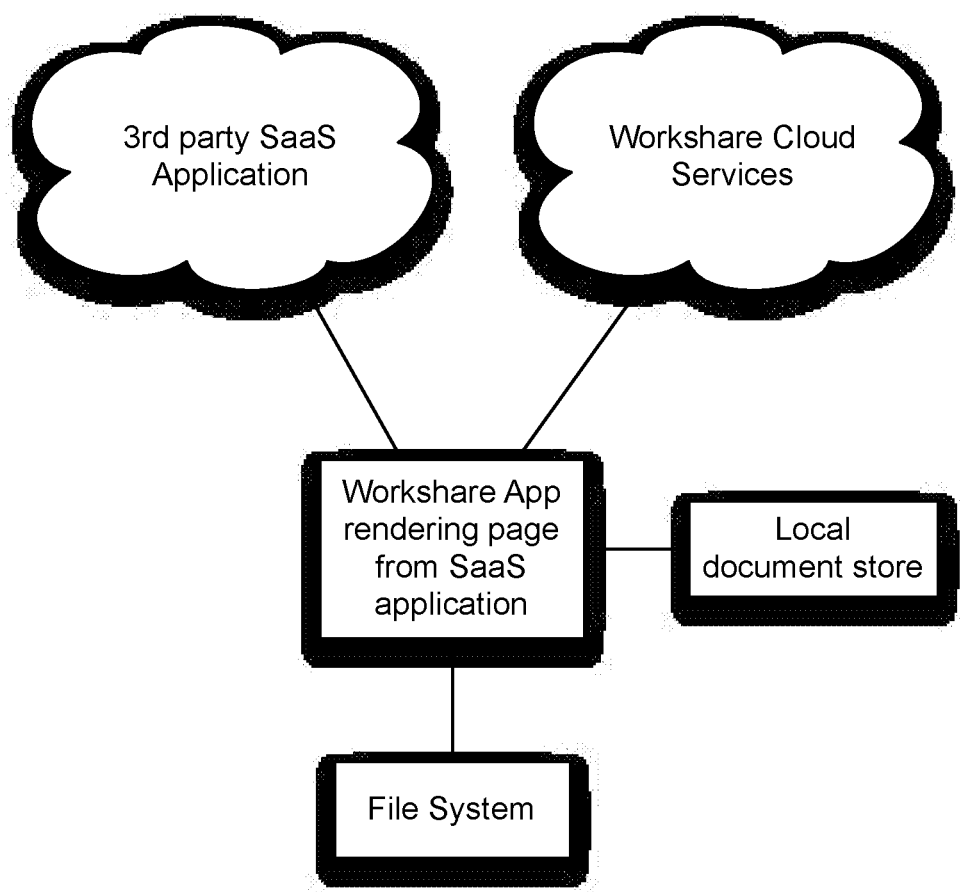
FIG. 3 shows the workflow where a user uploads a file saved from their local computer or from the Workshare system to a third party system.

A further embodiment of the invention would be an application that uses the public APIs of various 3rd party SAAS providers and rendering the information received via those APIs to show a representation of the files and or folders available to the user within the SAAS service. See FIG. 1. The distinction of this embodiment is that the rendering of the available content to the user is not performed by showing web pages originating from the SaaS provider within a web browser or web browser-like program. See FIG. 3.

The key to the process outlines above is that because the pages from the 3rd party SaaS application are being contained in the Workshare App, which is able to provide a different File Open and File Save function to which a standard browser rendering the same pages would provide. The SaaS application or other $3^{rd}$ party system is none the wiser—there is no specific integration between the Workshare App and the SaaS provider, it is simply that the JavaScript on the page is delegating the task of providing the file to the browser yet it is the Workshare Apps own implementation of this file selection function that is executed.

The key workflow can be summarized to the following:

1. User initiates an upload process, but instead of the normal web-browser response, Workshare App intercepts to provide the response.

2. User selects the file from whichever source, using a dialog provided by another system (DMS system for example).

3. The Workshare App process runs a security protocol on the file (or files) before passing the file (or its pointer) to the calling application, for example, the web-browser.

One embodiment of the invention is composed of Chromium Extension Framework (CEF) which is an open source version of the Chrome browser. This may be packaged as part of the Workshare App. In one embodiment, the invention is sub-classing CefDialogHandler which is detailed here, which is incorporates by reference the following software documentation: http://magpcss.org/ceforum/api-docs3/projects/(default)/CefDialogHandler.html CefDialogHandler is a class used to handle user interface dialog events. The methods of this class will be called on the browser process user interface thread. The class has a method OnFileDialog, depicted below:

public virtual bool OnFileDialog (CefRefPtr<CefBrowser>browser, CefDialogHandler::FileDialogMode mode, const CefString& title, const CefString& default_file_path, const std::vector<CefString>& accect_filters, int selected_accept_filter, CefRefPtr<CefFileDialogCallback>callback);

The method is called to run a file chooser dialog. |mode| represents the type of dialog to display. |title| is the title to be used for the dialog and may be empty to show the default title ("Open" or "Save" depending on the mode). |default_file_path| is the path with optional directory and/or file name component that should be initially selected in the dialog. |accept_filters| are used to restrict the selectable file types and may any combination of (a) valid lower-cased MIME types (e.g. "text/*" or "image/*"), (b) individual file extensions (e.g. ".txt" or ".png"), or (c) combined description and file extension delimited using "|" and ";" (e.g. "Image Types|.png;.gif;.jpg"). |selected_accept_filter| is the 0-based index of the filter that should be selected by default.

To display a custom dialog, return true and execute |callback| either inline or at a later time. To display the default dialog return false.

Implementing "CefDialogHandler::OnFileDialog" allows the invention to replace the default browser dialogs for "Open File" and "Save File". This function allows the invention to show the Workshare file selector user interface and then return a single, or multiple, absolute local file name(s) that can then be uploaded or accessed in the usual way in the loaded web page or java script.

Figure 5:
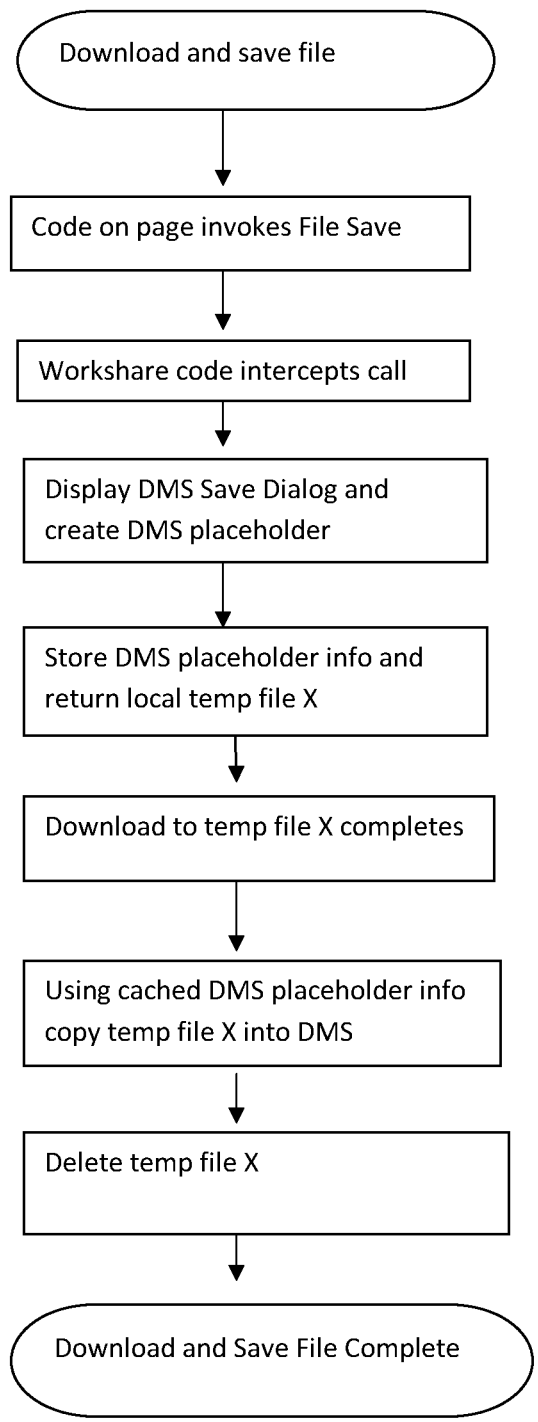
FIG. 5 shows the workflow where the user downloads the file from an external source.

The preferred implementation of "CefDialogHandler::OnFileDialog" gets called to handle an open file query (e.g. the method is triggered by the user clicking on this html element: <input type="file">). See FIG. 5.

For example, if a DMS is installed;
 the application uses a the DovProvider calls to show an "Open File" dialog to select a file from within the DMS.
 the application saves a temporary copy of this file from the DMS to the local file storage on the user computer operating the Workshare App or a central server operating the Workshare App that is being accessed by the user's device.

As a further example, the Workshare App is configured for Workshare to supply a list of files
 The system provides a dialog box and protocol to the user to select a file
 The system copies the selected file to a temp location
 At this point the invention applies a security policy to this temp local copy.
 The invention returns from "CefDialogHandler::OnFileDialog" the absolute local file name of this temp copy.
 At this point execution has returned to the web page/JavaScript which can now process the temp file as though it was manually selected from the local file store in the first place.

Figure 6:
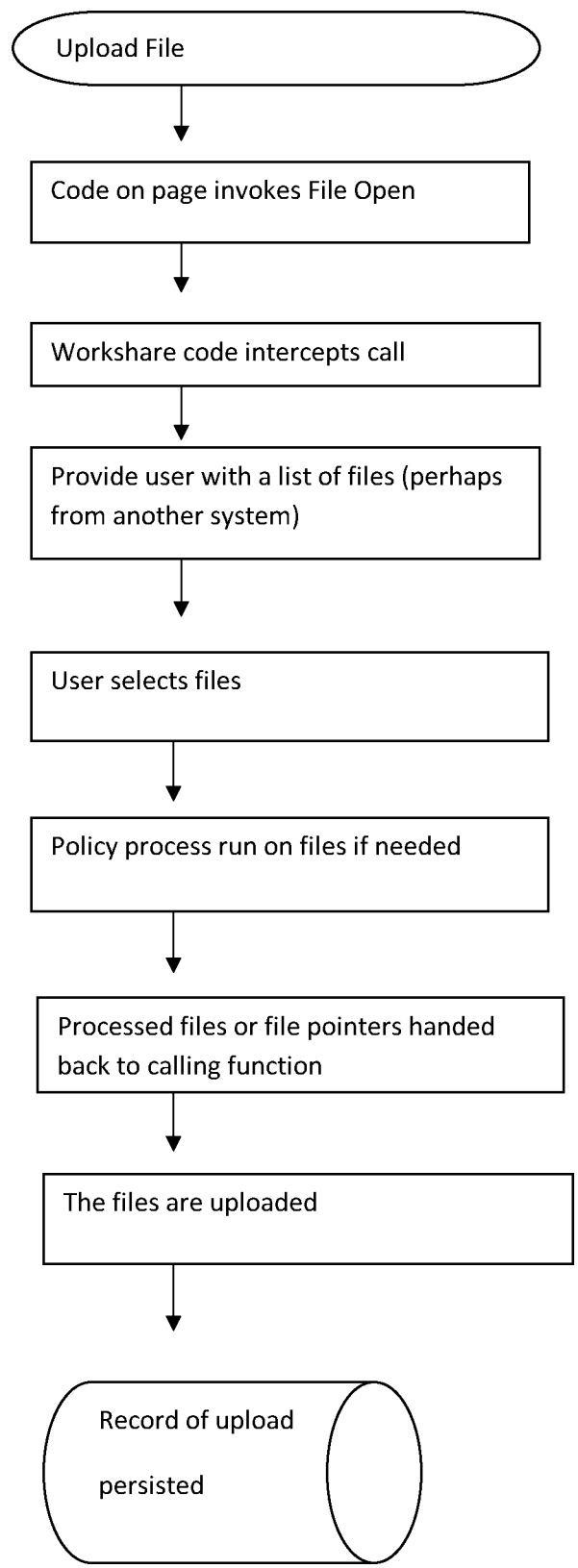
FIG. 6 shows the workflow where the user uploads the file from file storage.

A similar process may be used for file uploads, as depicted in FIG. 6. The same process may be used without an incumbent DMS. The process outlined above does not depend on their being a DMS system on the user's computer. In this case, the user would be offered files from their local computer, server or from a list of files they have stored in Workshare. All other parts of the workflow outlined above are still valid.

Using this method, the invention may be integrated for all of the above functionalities with any API based, client side (API installed on the user's computer) document management systems. Furthermore, the invention may be integrated to add both SaaS providers and client side API based systems to provide an ever growing mesh of integrations between each of these systems.

The invention stores data in its database The data that the invention stores in the database (109) may include the following fields for a transaction involving a document:
 Source of uploaded document (i.e. an identifier which may include one or more of: a service identifier such as DMS or FileStore, a server identifier, a path or folder identifier, a file name identifier and a version identifier).
 A user identifier indicating who performed the upload.
 Date and time of upload.
 Size of the uploaded file.
 The SaaS service that the file was uploaded to (note that this is not a complete identifier of where on the SaaS platform the file has been stored, just an identifier of which SaaS platform was selected—this field may be just 'service.net' not 'service.net/user/123/folder/23456/file/1238972342'.

Additional information to be stored in the database might include:
 A summary of metadata discovered in the document before upload.
 Information on content policies triggered by the upload of the document.
 Full location information specifying the exact location of the uploaded document.
 However, full location information (i.e. a full URL to the place it was uploaded) may not be available at the time of upload, but may be deduced later (for instance by inspecting the SaaS platform contents using an appropriate API and the user's credentials and finding a file that matches the size and upload time).

In another embodiment, the system receives a link to the file on the third party DMS, and then automatically exercises the link to obtain the file. The file is transferred to the user's device for display or editing. When the user is finished, the database can save the revised file as a new version on its server. Alternatively, the server can run the file upload process to return the new version up to the third party DMS. In addition, the invention can run a comparison of the user's revised file with the obtained version.

Operating Environment: The system is typically comprised of a central server that is connected by a data network to a user's computer. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well known computing systems, environments, and/or configurations that may be suitable for use with the invention include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like. The precise form factor of the user's computer does not limit the claimed invention. In one embodiment, the user's computer is omitted, and instead a separate computing functionality provided that works with the central server. In this case, a user would log into the server from another computer and access the system through a user environment.

The user environment may be housed in the central server or operatively connected to it. Further, the user may receive from and transmit data to the central server by means of the Internet, whereby the user accesses an account using an Internet web-browser and browser displays an interactive web page operatively connected to the central server. The central server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The method described herein can be executed on a computer system, generally comprised of a central processing unit (CPU) that is operatively connected to a memory device, data input and output circuitry (IO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades. The user interface also displays a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a 2 dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the web site can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two remote computers to exchange information by means of digital network communication. As a result a data message can be a data packet transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The user computer can operate a program that receives from a remote server a data file that is passed to a program that interprets the data in the data file and commands the display device to present particular text, images, video, audio and other objects. The program can detect the relative location of the cursor when the mouse button is actuated, and interpret a command to be executed based on location on the indicated relative location on the display when the button was pressed. The data file may be an HTML document, the program a web-browser program and the command a hyperlink that causes the browser to request a new HTML document from another remote data network address location. The HTML can also have references that result in other code modules being called up and executed, for example, Flash or other native code.

Those skilled in the relevant art will appreciate that the invention can be practiced with other communications, data processing, or computer system configurations, including: wireless devices, Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are used interchangeably herein, and may refer to any of the above devices and systems.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), or Unlicensed Mobile Access (UMA).

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space have different URL's. That is, the simulated space can be a unitary data structure, but different URL's reference different locations in the data structure. This makes it possible to simulate a large area and have participants begin to use it within their virtual neighborhood.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as C, C++, C#, Action Script, PHP, EcmaScript, JavaScript, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, components, data structures, etc., that perform particular tasks or implement particular abstract data types. The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card), or other memory device. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, the relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A computer system for automatically managing a movement of document files from a first document storage sub-system to a second document storage sub-system external to the first document storage sub-system, the computer system comprising:
    at least one non-transitory computer-readable medium configured to store instructions;
    at least one processor configured to execute the instructions to perform operations for:
        executing a first file selection dialog on a computer operated by a user interacting with the first document storage sub-system in order to receive data representing a selection of a document file stored on the first document storage sub-system,
        wherein the computer comprises a web-browser operating as a process on the computer, the web-browser having a default selection dialog for being presented to the user by default, the computer executing the first file selection dialog by:
            instead of presenting the default file selection dialog of the web-browser, intercepting the default file selection dialog prior to the presentation of the default file selection dialog and, instead, presenting and executing a custom file selection dialog as the first file selection dialog;
        using the received data of the first file selection dialog to obtain the selected document file from the first document storage sub-system;
        receiving the selected document file and storing the selected document file locally on the computer operated by the user;
        executing a second destination selection dialog on the computer operated by the user in order to receive data representing a selection of a destination comprised of the second document storage sub-system; and
        using the received data representing the destination selection to transmit the locally stored document file to the second document storage sub-system; and
    a database configured to store a data record associated with the selected document file comprised of data representing at least one of an identity of the selected destination or the date and time of the transmission of the locally stored document file.

2. The computer system of claim 1, wherein the instructions further comprise:
    applying a security policy to the locally stored document and the selected destination and,
    based on the output of such security policy, permitting or denying transmission of the locally stored document to the second document storage sub-system.

3. The computer system of claim 1, wherein the data record further comprises data representing at least one of:
    an identity of the user,
    an identity of the selected destination,
    date and time of receipt of the selected document,
    identify of the first document storage sub-system, or
    identity of the second document storage sub-system.

4. The computer system of claim 1, wherein the instructions further comprise performing, on the first document storage sub-system, at least one of:
    converting the format of the selected document file,
    removing hidden metadata, comments, or confidential information from the selected document file, or
    redacting at least a part of the selected document file.

5. The computer system of claim 1, wherein the instructions further comprise:
    running a security protocol on the locally stored document file; and
    allowing transmission of the locally stored document file or a pointer to the locally stored document file based on a result of the security protocol.

6. The computer system of claim 1, wherein the instructions further comprise storing on the first sub-system a data structure associated with the received selected document that maps between a first organizational paradigm associated with a first document management system further corresponding to the first document storage sub-system and a second organizational paradigm associated with a second document management system corresponding to the second document storage sub-system.

7. A computer system for automatically managing a movement of document files from a first document storage sub-system to a second document storage sub-system external to the first document storage sub-system, the computer system comprising:
    at least one non-transitory computer-readable medium configured to store instructions;
    at least one processor configured to execute the instructions to perform operations for:
        executing a first destination selection dialog on a computer operated by a user in order to receive data representing a selection of a destination comprised of the second document storage sub-system,
        executing a second file selection dialog on the computer operated by the user interacting with the first document storage sub-system in order to receive data representing a selection of a document file stored on the first document storage sub-system,
        wherein the computer comprises a web-browser operating as a process on the computer, the web-browser having a default selection dialog for being presented to the user by default, the computer executing the second file selection dialog by:
            instead of presenting the default file selection dialog of the web-browser, intercepting the default file selection dialog prior to the presentation of the default file section dialog and, instead, presenting and executing a custom file selection dialog as the second file selection dialog;
        using the received data of the first file selection dialog to obtain the selected document file from the first document storage sub-system;
        receiving the selected document file and storing the selected document file locally on the computer operated by the user; and
        using the received data representing the destination selection to transmit the locally stored document file to the second document storage sub-system; and a database configured to store a data record associated with the selected document file comprised of data representing at least one of an identity of the selected destination or the date and time of the transmission of the locally stored document file.

8. The computer system of claim 7, wherein the instructions further comprise:
applying a security policy to the locally stored document and the selected destination and,
based on the output of such security policy, permitting or denying transmission of the locally stored document to the second document storage sub-system.

9. The computer system of claim 7, wherein the data record further comprises data representing at least one of:
an identity of the user,
an identity of the selected destination,
date and time of receipt of the selected document,
identify of the first document storage sub-system, or
identity of the second document storage sub-system.

10. The computer system of claim 7, wherein the instructions further comprise performing, on the first document storage sub-system, at least one of:
converting the format of the selected document file,
removing hidden metadata, comments, or confidential information from the selected document file, or
redacting at least a part of the selected document file.

11. The computer system of claim 7, wherein the instructions further comprise:
running a security protocol on the locally stored document file; and
allowing transmission of the locally stored document file or a pointer to the locally stored document file based on a result of the security protocol.

12. The computer system of claim 7, wherein the instructions further comprise storing on the first sub-system a data structure associated with the received selected document that maps between a first organizational paradigm associated with a first document management system further corresponding to the first document storage sub-system and a second organizational paradigm associated with a second document management system corresponding to the second document storage sub-system.

* * * * *